(12) United States Patent
Edara

(10) Patent No.: US 8,532,652 B1
(45) Date of Patent: Sep. 10, 2013

(54) AUTONOMOUS SEARCH OF CLOSED SUBSCRIBER GROUP CELLS IN WIRELESS NETWORKS

(75) Inventor: Kiran K. Edara, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 24 days.

(21) Appl. No.: 13/297,889

(22) Filed: Nov. 16, 2011

(51) Int. Cl.
*H04W 4/00* (2009.01)

(52) U.S. Cl.
USPC ............ 455/434; 455/432.3; 455/435.2; 455/440; 455/444; 455/456.1

(58) Field of Classification Search
USPC .......... 455/444, 434, 435.2, 443, 439, 440, 455/441, 442
See application file for complete search history.

(56) References Cited

U.S. PATENT DOCUMENTS

| | | | |
|---|---|---|---|
| 6,807,163 B1 * | 10/2004 | Shi | 370/337 |
| 2010/0330989 A1 * | 12/2010 | Song et al. | 455/434 |
| 2012/0094663 A1 * | 4/2012 | Awoniyi et al. | 455/434 |

OTHER PUBLICATIONS

3rd Generation Partnership Project; Technical Specification Group Radio Access Network; User Equipment (UE) procedures in idle mode and procedures for cell reselection in connected mode (Release 9) 3GPP Organizational Partners 2010. V9.2.0 (Jun. 2010).

3rd Generation Partnership Project; Technical Specification Group Core Network and Terminals; Characterisites of the Universal Subscriber Identity Module (USIM) application (Release 8) 3GPP Organizational Partners 2010. V8.9.0 (Jun. 2010).

Horn, Gavin; Qualcomm; 3GPP Femtocells: Architecture and Protocalls, Sep. 2010.

* cited by examiner

*Primary Examiner* — Kathy Wang-Hurst
(74) *Attorney, Agent, or Firm* — Lowenstein Sandler LLP

(57) ABSTRACT

Methods and systems for autonomous search for Closed Subscriber Groups (CSGs) cells in wireless networks are disclosed. A user device determines current situational indicators of the user device and compares the current situational indicators to previously-recorded situational indicators stored in the user device. The user device also selects, based on the comparison, a closed subscriber group (CSG) cell from a list of CSG cells in the user device. Lastly, the user device searches for the CSG cell based on a proximity of a first location associated with the current situational indicators of the user device to a second location associated with the previously-recorded situational indicators of the CSG cell.

21 Claims, 8 Drawing Sheets

AUTONOMOUS SEARCH OF CLOSED SUBSCRIBER GROUP CELLS IN WIRELESS NETWORKS

BACKGROUND

In today's wireless communication networks, user devices such as electronic book readers, cellular telephones, personal digital assistants (PDAs), portable media players, tablet computers, and netbooks use technologies like Global System for Mobile Communications (GSM or 2G), Universal Mobile Telecommunications System (UMTS or 3G), or more recent 3GPP Long Term Evaluation (LTE or 4G) for wireless communication. These user devices typically have to search for cells rather frequently.

A recent introduction to the area of wireless communication networks is the femtocell. A femtocell is a small wireless access point that transmits voice and data cellular signals. A femtocell is typically designed for use in a home or a small business. It connects to a mobile operator's network through the broadband Internet connection of the end user of the femtocell. Current femtocell designs typically support a limited number of user equipment (user device), for instance up to 16 mobile phones in an enterprise setting.

A closed subscriber group (CSG) is a 3GPP term used to describe a limited set of users with connectivity access to a femtocell. When a femtocell is configured in CSG mode, only those users included in the femtocell's access control list are allowed to use the femtocell resources. On the other hand, a femtocell can be also configured in Open Access mode, in which any user is allowed access to the femtocell. When comparing non-CSG cells and CSG cells, it is the user device's priority to select and access the CSG cell because membership in a CSG cell is more cost-efficient and, in most cases, results in better service for the user device. On the network operator side, a user device's use of CSG cells offloads demand on the network's cells and thus is also preferred by the network as well.

A CSG cell provided by a femtocell is identified by a unique numeric identifier called CSG Identity or CSG ID, which is broadcast in system information by the femtocell hosting the CSG cell. To facilitate access control, a user device with one or more CSG cell subscriptions typically stores a CSG whitelist in a SIM card of the user device. The CSG whitelist contains one or more CSG IDs associated with the CSG cells on which the user device is allowed access.

The user device uses the CSG whitelist along with any CSG IDs broadcast by CSG cells in the user device's range for CSG cell selection and reselection operations. If a CSG cell is added to the system information of macro cells that surround the CSG cell, this may result in all UEs in or near the macro cell measuring the CSG cell. Such measurement would occur even if the user device is not a member of the CSG cells or if the user device does not subscribe to CSG cells at all. These unnecessary measurements would result in battery/current drain in the user device.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for autonomous search of closed subscriber groups (CSGs) in wireless networks are disclosed. A user device may be any mobile or content rendering device. Examples of such user devices include electronic book readers, cellular telephones, personal digital assistants (PDAs), portable media players, tablet computers, netbooks, and the like. A user device may connect to a network to obtain content from a server or to perform other activity.

Embodiments of the invention provide a user device implementation for autonomously detecting and measuring CSG cells for selection and reselection purposes. More specifically, embodiments of the invention use a variety of different information available on the user device to determine how close or how far the user device is from its home CSG cell in order to determine when to start searching for CSG cells, as well as the frequency at which it should search for the CSG cells. The various information used by the user device in the CSG cell search determination includes serving macro cell information, neighboring macro cell information, Global Positioning System (GPS) coordinates, available WiFi networks, time and day, context sensor data, and direction/orientation data.

Embodiments of the invention track the above information for all CSG cells that the user device is a member of and has previously camped on. The user device uses this information to determine when it is close to the CSG cell in terms of proximity and time/day typical access range. In addition, embodiments of the invention dynamically adjust the search and measurement parameters for the CSG cell based on the above information. For instance, as the user device gets closer to a CSG cell based on the serving macro cell of the user device, the surrounding macro cell neighbors of the user device, and the available WiFi networks around the user device (i.e., this data is all similar to the data stored for the CSG cell), the user device will increase its search frequency for the anticipated CSG cell, and vice versa.

Figure 1:
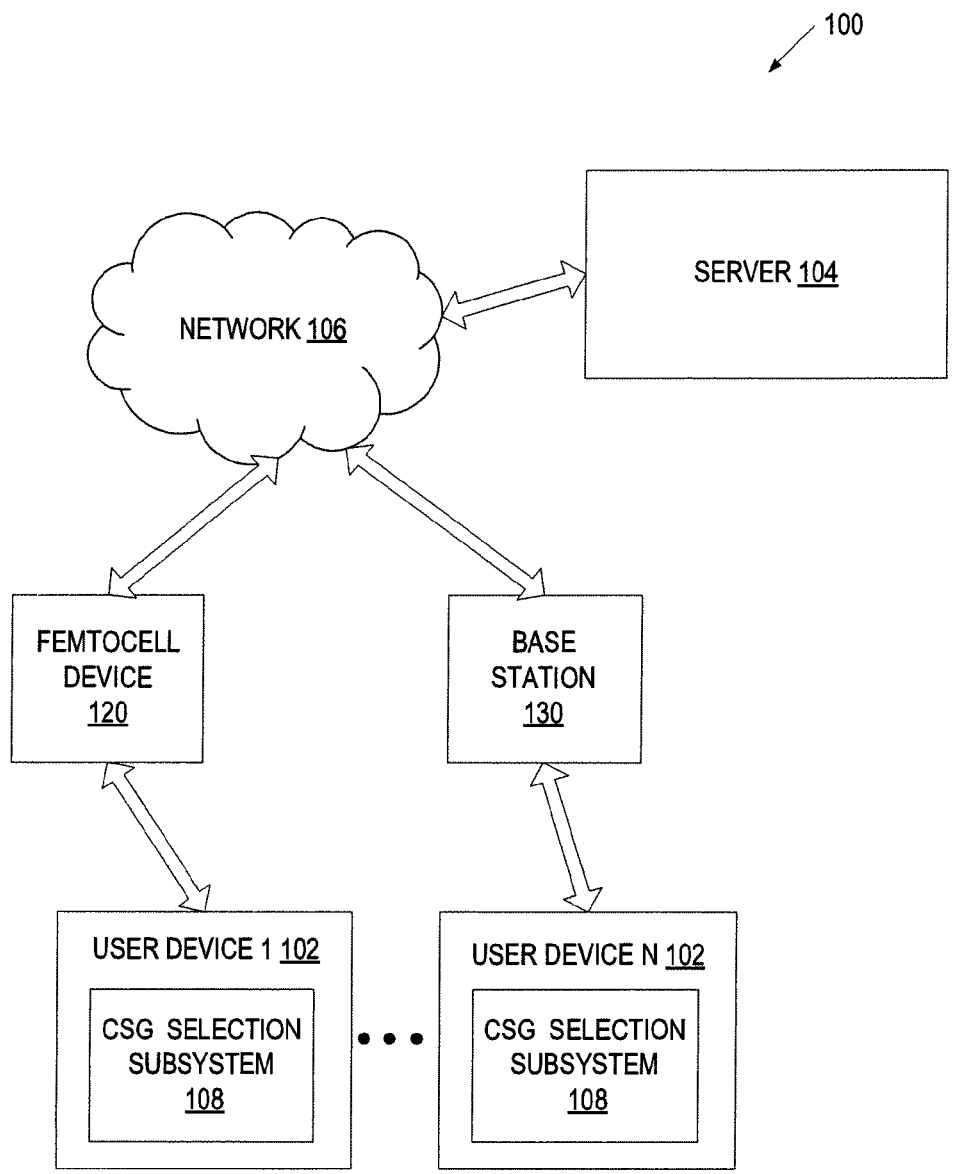
FIG. 1 is a block diagram of an exemplary network architecture in which embodiments of the invention may operate.

FIG. 1 is a block diagram of exemplary network architecture 100 in which embodiments of the invention may operate. The network architecture 100 may include a server 104 and multiple user devices 102 coupled to the server 104 via a network 106 (e.g., an operator network such as a mobile communication provider's network, a public network such as the Internet, or a private network such as a local area network (LAN)). Throughout the following description, user device 102 and the term "user equipment" (user device) may be used interchangeably and are meant to refer to the same component 102.

The user devices 102 are variously configured with different functionality to enable voice communication and/or consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multi-media content and software updates. The user devices 102 may include any type of computing devices such as electronic book readers, portable digital assistants, mobile phones, laptop computers, portable media players, tablet computers, cameras, video cameras, netbooks, notebooks, desktop computers, gaming consoles, DVD players, media centers, and the like.

The server 104 may be a network operator (service provider) server, a network-based server (referred to as a cloud server), a content provider server, an access point provider server, or any other server that provides various services to user devices 102 via the network 106. In one embodiment, the sever 104 downloads items, upgrades, and/or provides other information to the user devices 102 via the network 106. The server 104 also receives various requests, instructions and other data from the user devices 102 via the network 106. The server 104 may include one or more machines (e.g., one or more server computer systems, routers, gateways) that have processing and storage capabilities to provide the above functionality.

Communication between the server 104 and a user device 102 may be enabled via any communication infrastructure. One example of such an infrastructure includes a combination of a wide area network (WAN) and wireless infrastructure, which allows a user to use the user device 102 to purchase items and consume items without being tethered to the server 104 via hardwired links. The wireless infrastructure may be provided by a network operator (service provider) system that can be implemented using various data processing equipment, communication towers, etc. Alternatively, or in addition, the network operator system may rely on satellite technology to exchange information with the user device 102. Yet alternatively, or in combination, the wireless infrastructure may be provided by an access point (e.g., WiFi access point) provider system.

The communication infrastructure may also include a communication-enabling system that serves as an intermediary in passing information between the server 104 and the wireless network operator. The communication-enabling system may communicate with the wireless network operator via a dedicated channel, and may communicate with the server 104 via a non-dedicated communication mechanism, e.g., a public network such as the Internet.

The server 104 may pay the network operator a fee based on the aggregate use of the network operator system by all of the user devices 102. The server 104 may recoup these costs through fees charged to the end-users separately or as part of other purchases (e.g., purchase of digital content) made by the end-users. Alternatively, the network operator may submit bills directly to individual users, or may submit bills to either the server 104 (in aggregate) or to the individual users, at the option of the individual respective users.

As part of the procedure by which a user device 102 attaches to the network of the server 104, the user device 102 is provided information by the server 104. Such information may be provided once the user device 102 has connected to (camped onto) a cell and tuned into that cell's control channel. Such information may include registration area information from the PLMN (e.g., location area and routing area), and if registered, paging and notification messages and call setup signals.

It is common for a user device 102 to connect to server 104 through a base station 130. Base station 130 may be a base transceiver station (BTS) in GSM and CDMA, a nodeB in UMTS, or a eNodeB (enhanced nodeB) in LTE. However, in some embodiments, user devices 102 may be connect to the server 104 through a femtocell device 120. As used herein, a femtocell refers to a small cellular base station, typically designed for use in a home or small business. It connects to the service provider's network via broadband (such as DSL or cable). A femtocell allows service providers to extend service coverage indoors, especially where access would otherwise be limited or unavailable. A limited set of users may connect to femtocell 120. This limited set of users is a CSG. CSG in the standards refers to a Closed Subscriber Group which is a set of subscribers of an operator who are permitted to access one or more cells of a PLMN, these one or more cells having restricted access. As used herein, a CSG refers to a group of users permitted access to a femtocell device.

Figure 2:
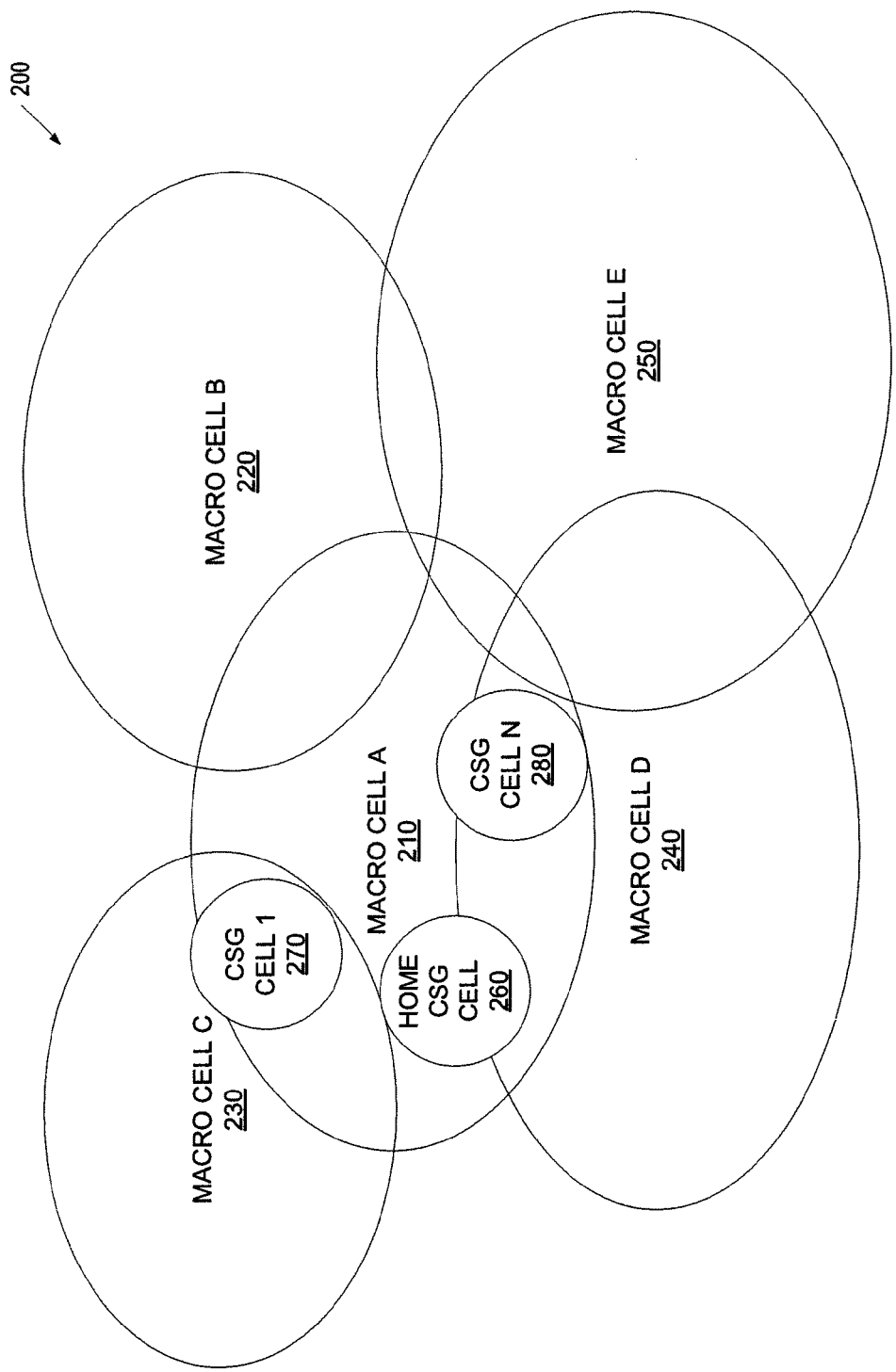
FIG. 2 is a block diagram of one embodiment of a Closed Subscriber Group (CSG) selection subsystem.

In one embodiment, femtocell 120 is configured in CSG mode, so that only those user devices 102 included in the femtocell's 120 access control list are allowed to use the femtocell 120 resources. The service area of femtocell 120 can be referred to as a CSG cell. FIG. 2 is a block diagram depicting a plurality of macro cells of a mobile communication network 200 according to embodiments of the invention. In one embodiment, server 104 of FIG. 1 may be the network operator of mobile communication network 200 and user device 102 of FIG. 1 may be managed by a subscriber of network operator that camps on any of the macro cells 210-250 of network 200 depending on the location of user device 102.

Macro cells A-E 210-250 are cells in mobile communications network 200 that provide radio coverage served by high power cellular base stations. Also illustrated in FIG. 2 are a plurality of CSG cells 260-280. One of these CSG cells may be a home CSG cell 260 to which user device 102 is registered. In order to register with home CSG cell 260, the network operator of user device 102 configures a CSG whitelist stored on user device 102 (e.g., in a SIM card or non-volatile memory) with the identification information (CSG ID) of the home CSG cell 260.

When user device 102 is located in the service areas of both macro cell A 210 and home CSG cell 260, user device 102 prioritizes access and registration to the home CSG cell 260 over macro cell A 210. This is because membership in a CSG cell is more cost-efficient and, in most cases, results in better service for the user device 102. Moreover, the use of CSG cells by user devices 102 offloads demand on the network's macro cells 210-250 and is therefore also preferred by the network operator.

As shown in FIG. 1, user device 102 may include a CSG selection subsystem 108 to provide autonomous search capabilities for CSGs in a wireless network. In one embodiment, CSG selection subsystem 108 detects and measures CSG cells for selection and reselection purposes when the user device 102 is in a discontinuous reception mode, such as an Idle mode, Out of Service mode, or Transfer to Idle mode (e.g., Call Release mode).

CSG selection subsystem 108 may use a variety of different information available on the user device to determine the relative distance that the user device 102 is from its home CSG cell in order to determine when to start and stop searching for the CSG cell, as well as to determine the frequency at which the user device 102 should search for this CSG cell.

The information used in the CSG cell search determination procedure may include, for example, information about the serving macro cell, information about neighboring macro cells, GPS coordinates, available WiFi networks, time and day, context sensor data, and direction/orientation data. Embodiments of the invention thereby minimize the battery drain on the user device 102, as well as allow the user device 102 to camp on the user device's CSG cell as quickly as possible.

Figure 3:
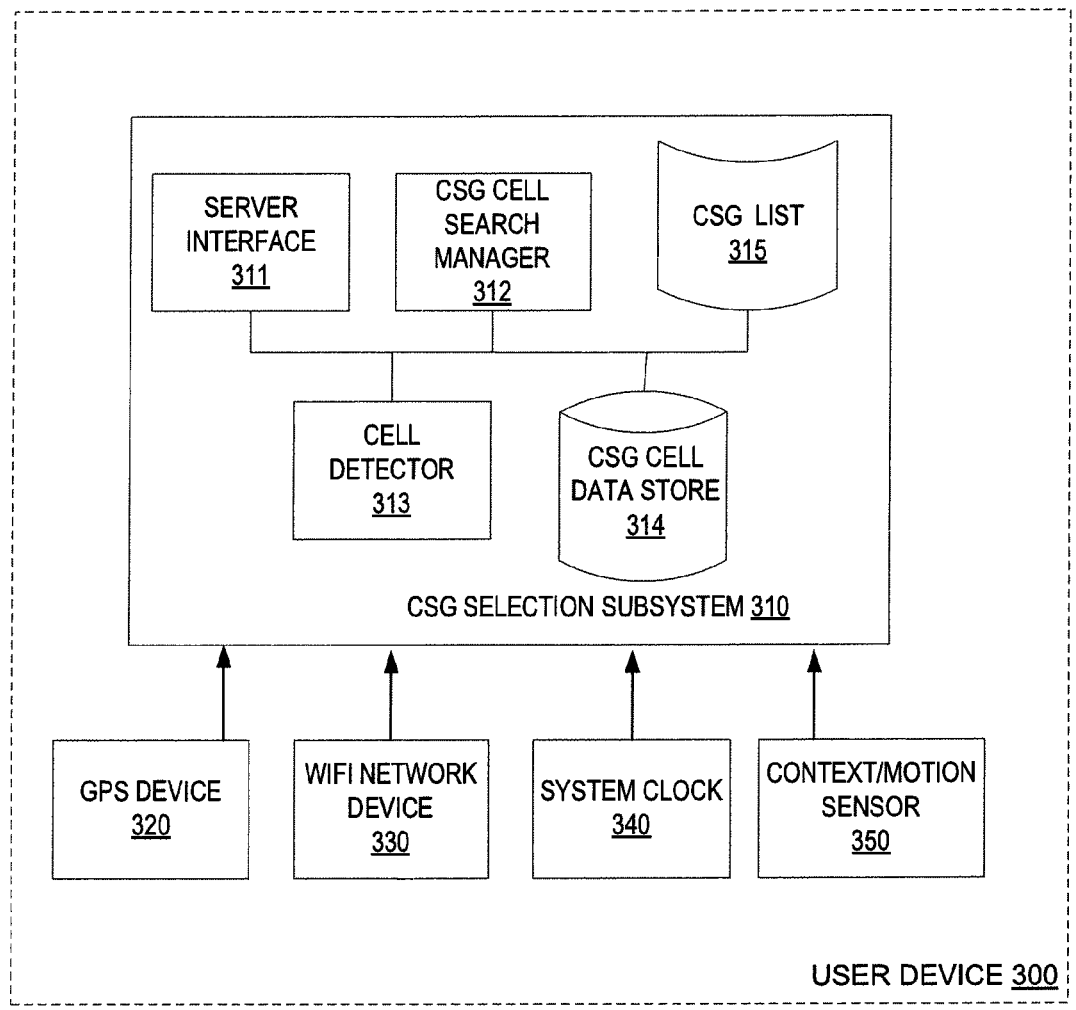
FIG. 3 is a block diagram of one embodiment of a CSG selection subsystem hosted by a user device.

FIG. 3 is a block diagram of one embodiment of a CSG selection subsystem 310 hosted by a user device 300. In one embodiment, CSG selection subsystem 310 is the same as CSG selection subsystem 108 of FIG. 1 and user device 300 is the same as user device 102 of FIG. 1. CSG selection subsystem 310 may include a server interface 311, CSG cell search manager 312, cell detector 313, CSG cell data store 314, and CSG list 315. The components of the CSG selection subsystem 310 may represent modules that can be combined together or separated into further modules, according to some embodiments.

In one embodiment, server interface 311 interacts with a network server (such as network server 104 described with respect to FIG. 1) to receive any system information needed to establish or maintain mobile network communication connections on the user device 300. The system information may include, but is not limited to, registration area information from the PLMN (e.g., location area and routing area), and if registered, paging and notification messages and call setup signals.

CSG selection subsystem 310 also includes a CSG cell search manager that is responsible for implementing the autonomous search procedure for CSG cells by the user device 300. CSG cell search manager is communicably coupled to a cell detector 313 and a CSG cell data store 314, which both assist in the autonomous search procedure for CSG cells. In one embodiment, the first time a CSG cell is accessed by the user device 300, the CSG cell search manager 312 confirms that the CSG list 315 includes the identifying information of the CSG cell. In one embodiment, the CSG list 315 may be stored in a SIM card on the user device 300. In other embodiments, the CSG list 315 is stored in a non-volatile memory of the user device 300.

If the CSG cell is not on the CSG list 315, then user device 300 would not be allowed access to the CSG cell. On the other hand, if the CSG cell is found on the CSG list, then the CSG cell search manager 312 stores a variety of information about the CSG cell to the CSG cell data store 314. The information about the CSG cell that is stored in the CSG cell data store 314 includes, for example, the information about the macro cell that the CSG cell is located in, as well as information about the neighboring macro cells. Such information may include, but is not limited to, a cell ID, frequency, scrambling code, and base station identity code (BSIC). If there are no macro cells in the service are of the CSG cell, then this information is not gathered.

In addition, embodiments of the invention also gather information about any available WiFi networks in the area of the CSG cell, the GPS coordinates of the CSG cell, a time and day of access to the CSG cell, and any context-aware sensor data taken at the time of CSG cell access. This information may be gathered by communicating with other devices on the user device 300, such as a GPS device 320, a WiFi network device 330, a system clock 340, and a context/motion sensor 350 of the user device 300. If the user device is not capable of gathering certain information from a user device 320-350 (e.g., if the user device 300 does not have a GPS device 320 or a context/motion sensor 350, or a device is not turned on), then the CSG cell search manager 312 will not collect the associated information from that device.

Once the CSG selection subsystem has completed its first initial connection to and data collection for a CSG cell, embodiments of the invention may utilize this information to provide an optimized and autonomous search procedure for the CSG cell. Embodiments of the invention are applicable when the user device 300 is in a discontinuous reception mode, such as when the user device 300 is in an Idle mode. Embodiments of the invention are also applicable when the user device 300 is in an Out of Service mode or in a Transfer to Idle mode (e.g., at call release), where the user device 300 checks to determining an updated best cell for the user device 300.

In some embodiments, when the user device 300 is in discontinuous reception mode and wakes up to take a cell measurement, the CSG cell search manager 312 instructs the cell detector 313 to obtain data about the current macro cell the user device 300 is in and any neighboring macro cells that may be detected. In addition, the CSG cell search manager 312 gathers current GPS coordinates from GPS device 320, data regarding any available WiFi networks from WiFi network device 330, the current time and day from system clock 340, and data regarding the context, orientation, and direction of the user device 300 from context/motion sensor 350. Using this collected information, the CSG cell search manager 312 then determines a proximity to any of the CSG cells listed in CSG list 315 based on a comparison to the stored data in CSG cell data store 314 for each of those listed CSGs.

Figure 4:
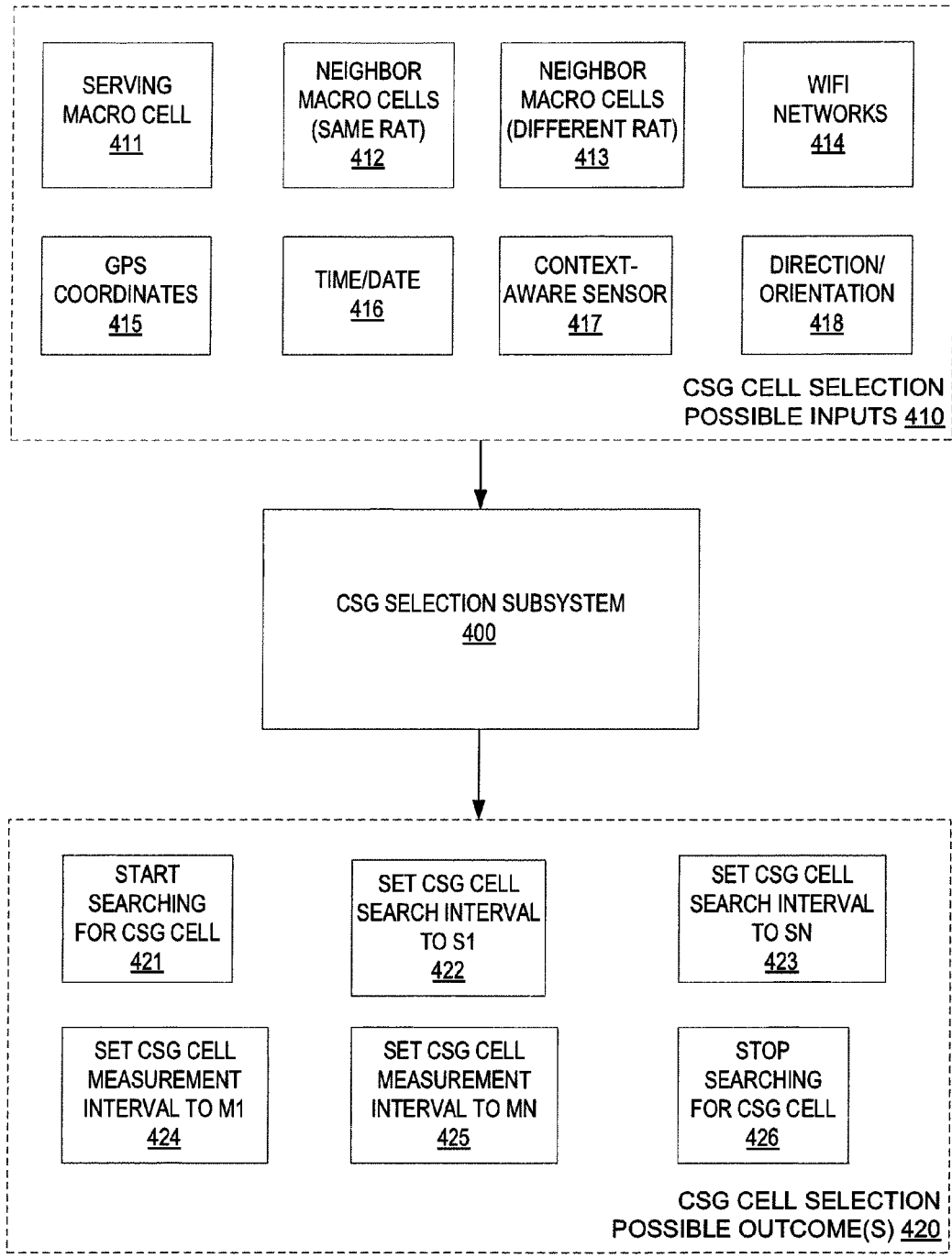
FIG. 4 is a block diagram of one embodiment of potential inputs and outputs to CSG selection subsystem.

In particular, some embodiments utilize a plurality of thresholds to dictate actions that the CSG cell search manager 312 may take based on a proximity to a CSG cell in the CSG list 315. The thresholds and their corresponding actions may be configured by a user of the user device 300, and re-programmed as needed. FIG. 4 is a block diagram depicting one embodiment of the potential inputs and outputs to CSG selection subsystem 400. In one embodiment, CSG selection subsystem 400 is the same as CSG selection subsystem 310 described with respect to FIG. 3. CSG selection subsystem may receive a variety of possible inputs 410 regarding the present location of the user device 300. These inputs may include the serving macro cell 411, neighbor macro cells on the same Radio Access Technology (RAT) 412, neighbor macro cells on a different RAT 413, available WiFi network 414, GPS coordinates 415, time and day 416, context of the user device 417, and direction/orientation of the user device 418.

Based on these inputs, the CSG selection subsystem 400 accesses stored historical location data for one or more CSGs on the CSG list 315. By comparing each of the input data to the corresponding historical data kept for a CSG, the CSG selection subsystem is able to determine a proximity to a closest CSG cell on the CSG list 315. In addition, the CSG selection subsystem 400 may take one of a variety of actions based on whether the input data triggers an action by crossing a threshold. These actions are shown as possible outcomes 420. The possible outcomes 420 include start search for CSG cell 421, set CSG cell search interval to a range of time intervals from S1 421 to Sn 422, set CSG cell measurement interval to a rage of from M1 424 to Mn 425, and stop searching for CSG cell 426.

In one embodiment, "search interval" refers to intervals when a user device performs a search for CSG cells. "Measurement interval" refers to intervals when a user device performs measurements on the CSG cells that are already detected by the device, but signal strength for these CSG cells indicate that they are not yet suitable for camping.

In one embodiment, the CSG selection subsystem 400 utilizes configured thresholds that are triggered by the inputs 410 to determine which outcome 420 is selected. In one embodiment, each input data 411-418 has its own set of thresholds to trigger specific actions 421-426 by the CSG selection subsystem 300. In other embodiments, the input data 410 may be combined to create a single indicator that is compared to a single set of thresholds to determine which action 421-426 to take.

For example, CSG selection subsystem 400 may search for a particular CSG cell only when the user device 300 enters the macro cell on which the CSG was last found. The cell ID, frequency, scrambling code, and BSIC of the macro cell 411 may be used to determine when the user device 300 enters this cell. In addition, CSG selection subsystem 400 may increase or decrease the frequency of searching for this CSG cell based on whether one or more neighbor macro cells 412, 413 are also detected at the same time.

In addition, some embodiments may utilize other location data in the determination of when and how to search for a CSG cell. For instance, if the GPS device 320 is turned on, the CSG selection subsystem 400 may make use of the GPS coordinates 415 to trigger a search or update a search interval for a CSG cell when the user device 300 is in close proximity to it. The CSG selection subsystem 400 also may trigger a search for a CSG cell when the user device 300 enters the realm of any WiFi networks 414 that were found near the CSG cell upon its last access. Similarly, data from a context aware sensor 417 may indicate to the CSG selection subsystem 400 that the user device 300 is in a similar context (e.g., home, office, car, etc.) than the previous context of a CSG cell when last accessed. The CSG selection subsystem 300 may use this information to trigger the search for the CSG cell or in determining the frequency of search for the CSG cell.

In addition, the direction and orientation data 418 of the user device 400, as determined from the GPS device 320 and context/motion sensors 350, may be used to trigger the search for the CSG cell or in determining the frequency of search for the CSG cell. For example, if this data indicates that the device is moving towards the CSG cell, then the search frequency may be increased, or if the data indicates that the user device 300 is moving away from the CSG cell, then the search frequency may be decreased or stopped altogether.

In some embodiments, the time and day information 416 may also be utilized by CSG selection subsystem 300 to trigger a search or increase/decrease the search frequency for a CSG cell. Based on historical time and day data points kept by CSG selection subsystem 400 that indicate the user device 300 typically camps on a CSG cell at particular days and time, the CSG selection subsystem 400 may start a search for the CSG cell or search at a faster frequency when these days and times occur.

One example of how the above inputs 410 and outputs 420 are processed by CSG selection subsystem 400 is now discussed. Referring to FIG. 2, assume that a user device 300 is currently located in macro cell B 220 in an Idle mode, and has home CSG cell 260 on its CSG list 315 as its only allowed CSG cell. If user device 300 starts traveling towards home CSG cell 260 and enters macro cell A 210, then, in one embodiment, CSG selection subsystem 400 may start searching for home CSG cell 260 at a default search frequency.

Other location data may be utilized to refine how the search for the home CSG cell 260 is accomplished. For instance, when neighbor macro cells C 230 and D 240 are detected by user device 300, then CSG selection subsystem 400 may set a new search interval for the home CSG cell 260 that is faster than the previous search frequency. If the GPS coordinates and context sensor data indicate that the user device 300 is very close to the home CSG cell 260, the search frequency may be further increased. Similarly, if the user device is in macro cell A 210 and the time and day data indicate that the user device 300 is in a typically time period that the user device 300 camps on the home CSG cell 260, then the search frequency may also be increased. In some embodiments, this frequency increase may occur even if no neighboring macro cells are found and/or other location data does not indicate proximity to the home CSG cell 260.

On the other hand, if user device starts traveling away from home CSG cell 260 towards macro cell E 250 (determined based on neighboring macro cell data and direction/orientation data), then CSG selection subsystem 400 may set a new search interval for the home CSG cell 260 that is slower than the previous search frequency. If the user device 300 leaves macro cell A 210 altogether and is in macro cell E 250, then CSG selection subsystem 400 may stop searching for the home CSG cell 260. Note that although user device 300 may in some cases be near other CSG cells, such as CSG cell 1 270 and CSG cell 2 280, user device 300 does not search for these cells 270, 280 as their corresponding IDs are not stored in the CSG list 315.

The above example is just one depiction of how embodiments of the invention may be realized. One skilled in the art will appreciate that there are a variety of situations and outcomes that are relevant to embodiments of the invention, and they are not limited to the above example.

Figure 5:
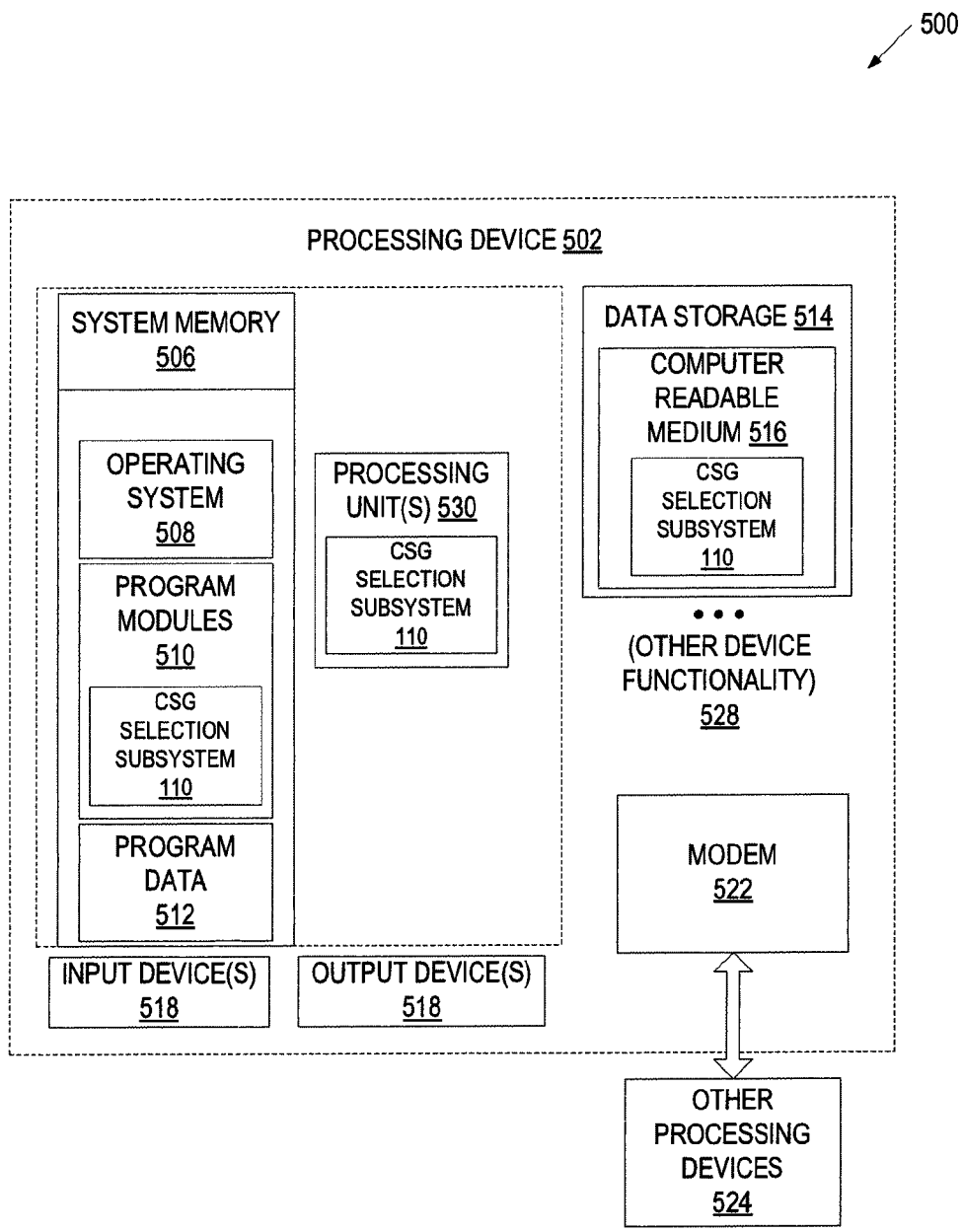
FIG. 5 is a block diagram illustrating an exemplary user device.

FIG. 5 is a block diagram illustrating an exemplary user device 500. The user device 500 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 500 may further be in the form of a computer system within which a set of instructions, for causing the machine to perform any one or more of the methodologies discussed herein, may be executed. In alternative embodiments, the machine may be connected (e.g., networked) to other machines via a network (not shown), where network may be a LAN, an intranet, an extranet, or the Internet. In some embodiments, the machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The user device 500 includes one or more processing units 504, such as one or more CPUs. The user device 500 also includes system memory 506, which may correspond to any combination of volatile and/or non-volatile storage mechanisms. The system memory 506 may store information which provides an operating system component 508, various program modules 510 including CSG selection subsystem 108, program data 512, and/or other components. The user device 500 performs functions by using the processing unit(s) 504 to execute the CSG selection subsystem 108 and other instructions provided by the system memory 506.

The user device 500 may also include a data storage device 514 that may consist of one or more types of removable storage and/or one or more types of non-removal storage. The data storage device 514 may include a computer-readable medium 516 on which is stored one or more sets of instructions (e.g., instructions of the CSG selection subsystem 108) embodying any one or more of the methodologies or functions described herein. As shown, instructions of the CSG selection subsystem 108 may also reside, completely or at least partially, within the system memory 506 and/or within the processing unit(s) 530 during execution thereof by the user device 500, the system memory 506 and the processing unit(s) 530 also constituting computer-readable media. The instructions of the CSG selection subsystem 108 may further be transmitted or received over a network.

While the computer-readable storage 514 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The user device 500 may also include one or more input devices 518 (keyboard, mouse device, specialized selection keys, etc.) and one or more output devices 520 (displays, printers, audio output mechanisms, etc.). The user device 500 may further include a wireless modem 522 to allow the user device 500 to communicate via a wireless network with other computing devices 524, such as remote computers, the server 104, and so forth. The wireless modem 422 may allow the user device 400 to receive a voice call and also communicate with the server 104 in a data mode. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, long term evaluation (LTE) and WiMax.

The above-enumerated list of modules is representative and is not exhaustive of the types of functions performed by the user device 500. As indicated by the label "Other Device Functionality" 528, the user device 500 may include additional functions.

Figure 6:
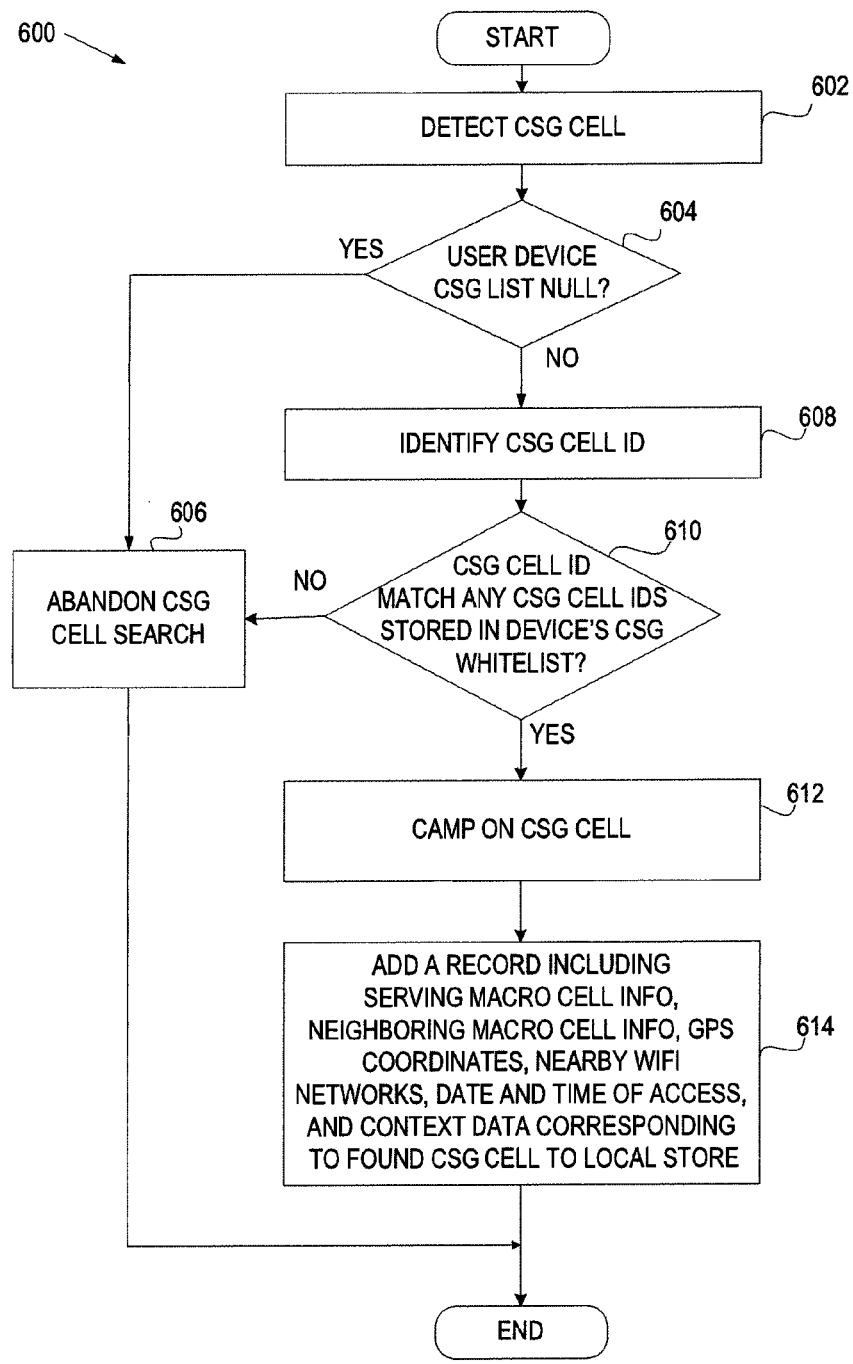
FIG. 6 is a flow diagram of one embodiment of a method for CSG cell data collection that occurs when a user device camps on a CSG cell.
Figure 7:
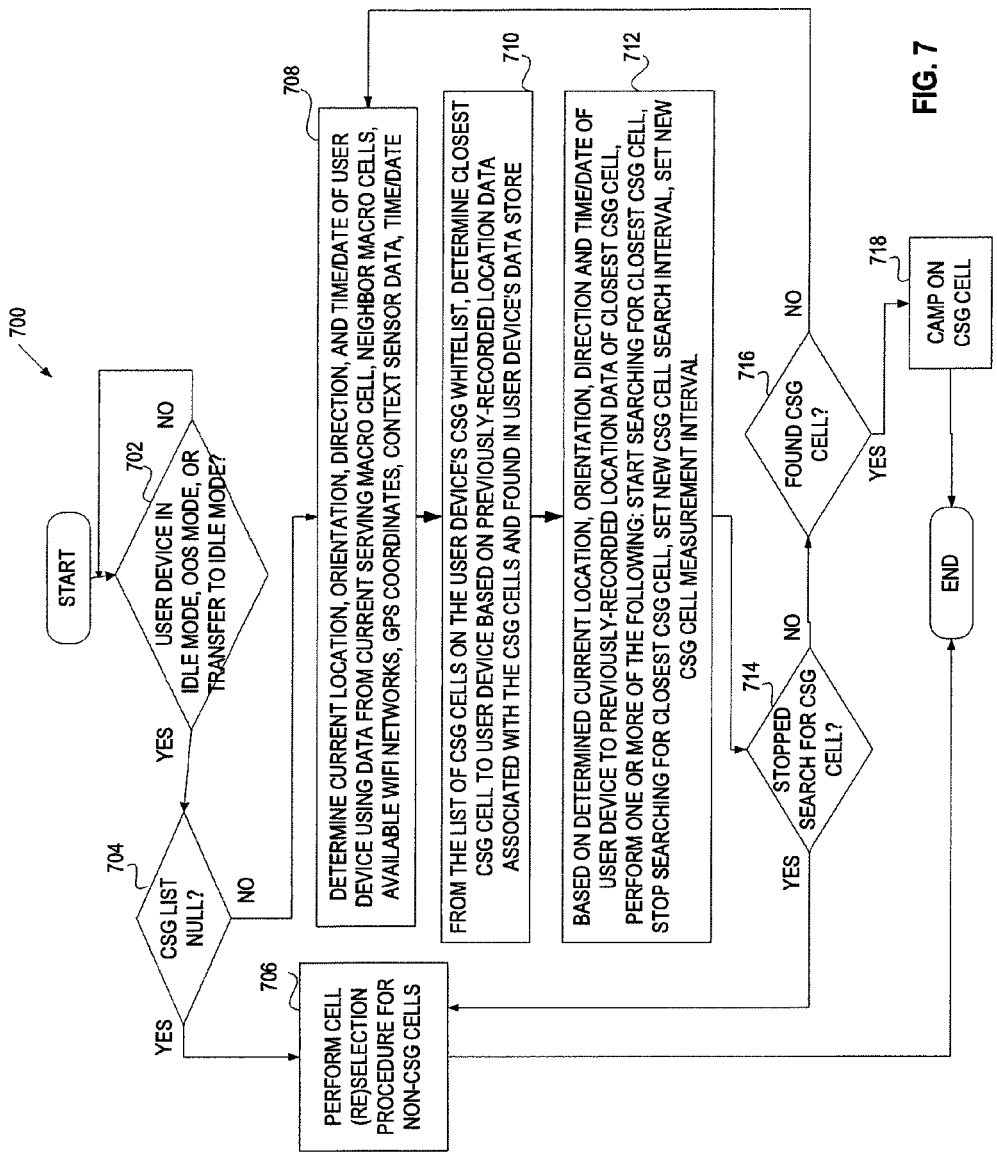
FIG. 7 is a flow diagram of one embodiment of a method for autonomous search and selection of a CSG cell by a user device.
Figure 8:
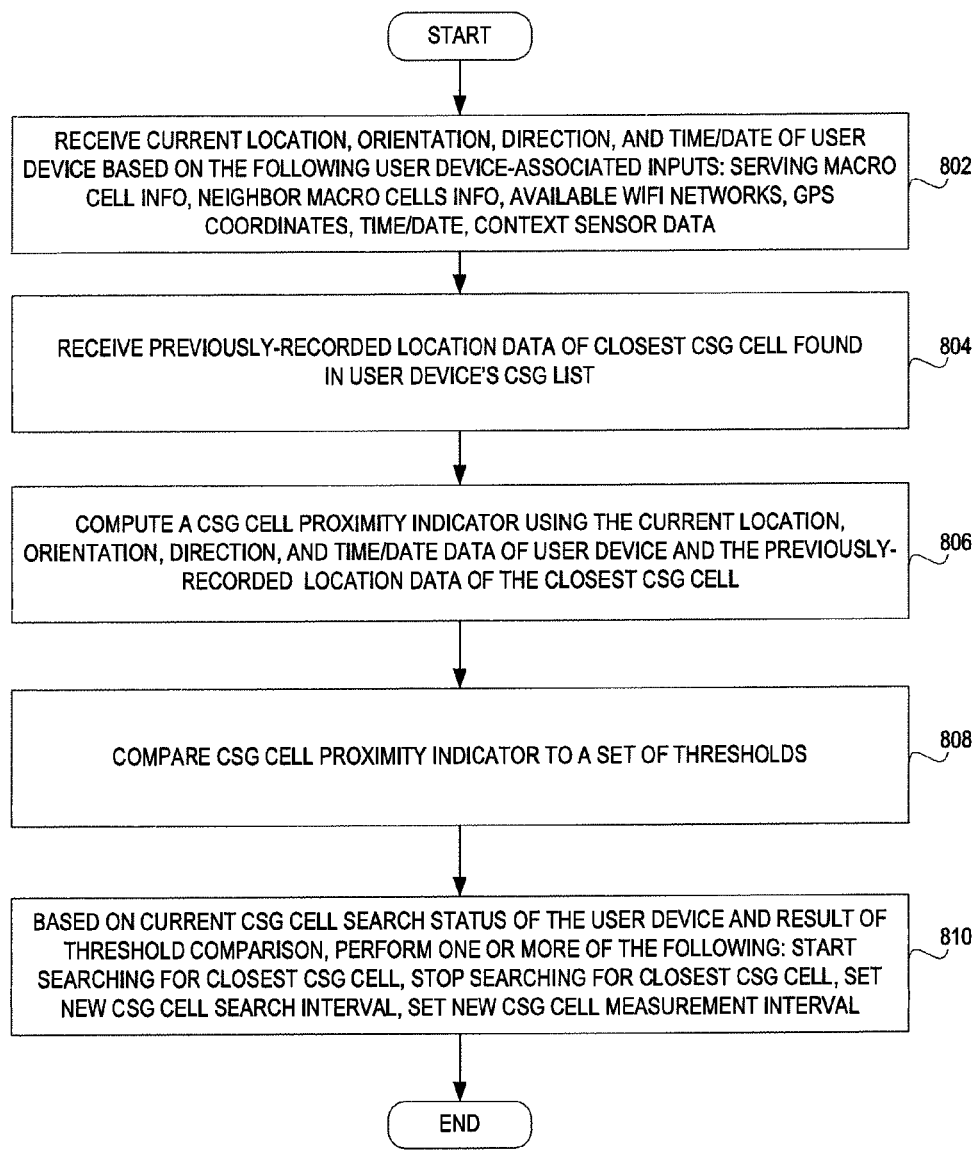
FIG. 8 is a flow diagram of another embodiment of a method for autonomous search and selection of a CSG cell by a user device.

FIGS. 6 through 8 are flow diagrams of some embodiments of user device methods. The methods are performed by processing logic that may comprise hardware (circuitry, dedicated logic, etc.), software (such as is run on a general purpose computer system or a dedicated machine), or a combination of both. In one embodiment, embodiments of the methods are performed by a user device (e.g., a CSG selection subsystem 108 of user device 102 of FIG. 1).

FIG. 6 is a flow diagram of one embodiment of a method 600 for CSG cell data collection that occurs when a user device camps on a CSG cell. Method 600 begins at block 602 where a new CSG cell is detected. Then, at decision block 604, it is determined whether the CSG list on the user device is null. If so, then at block 606, the user device abandons the CSG cell search. If not, then method 600 continues to block 608 where the CSG cell ID of the detected CSG cell is identified. Then, at decision block 610, it is determined whether the identified CSG cell ID matches any CSG cell IDs listed in the user device's CSG list. If not, then method 600 continues to block 606 to abandon the CSG cell search.

If the CSG cell ID does match a CSG cell in the CSG list, then method 600 continues to block 612 when the user device performs the process to select and camp on the CSG cell. Subsequently, at block 614, a record is added (or modified if record already exists) for the CSG cell to a CSG data store on the user device. In one embodiment, this record stores information about the CSG cell including serving macro cell information (i.e., cell ID, frequency, scrambling codes, BSIC), neighboring macro cell information (i.e., cell IDs, frequencies, scrambling codes, BSICs), GPS coordinates, nearby WiFi networks, day/time of access, and context sensor data corresponding to the CSG cell location. In one embodiment, any previous record data, except for historical day and time data, for the CSG cell is over-written. In other embodiments, all previous data for a CSG cell is kept in the data store in addition to the new data.

FIG. 7 is a flow diagram of one embodiment of a method 700 for autonomous search and selection of a CSG cell by a user device. Method 700 begins at decision block 702 where it is determined whether the user device is in at least one of an Idle mode, an Out of Service mode, or a Transfer to Idle mode. If the user device is not in a any of these modes, then method 700 remains at block 702 until the user device enters a at least one of an Idle mode, an Out of Service mode, or a Transfer to Idle mode. Once the user device is in one of the above-listed modes, method 700 continues to decision block 704 where it is determined whether the CSG list is null. If so, then the user device does not search for any CSG cells and method 700 continues to block 706 to perform a cell selection and reselection procedure for normal cells.

On the other hand, if the user device CSG list is not null then the user device should perform a CSG cell selection and reselection procedure. In this case, method 700 continues to block 708 where an approximate location, orientation, direction, and time/day of the user device are determined. In one embodiment, data is collected regarding the current serving macro cell, any neighboring macro cells, any available WiFi networks, GPS coordinates of the user device, context sensor data of the user device, and a current time and date of a system clock of the user device. In one embodiment, if this data is not available, then it is not collected and used in the user device determination. Embodiments of the invention use the largest set of data that can be collected to make the location, orientation, direction, and time/day determination of block 708.

Subsequently, at block 710, a closest CSG cell is determined from the list of CSG cells on the user device's CSG list. The determination of which CSG cell is closest is made based on comparison of the data collected regarding the current position of the user device from block 708 against previously-recorded and stored location data associated with the CSG cells of the CSG list. In one embodiment, the previously-recorded location data of the CSG cells is stored in the user device each time a CSG cell is accessed.

Then, at block 712, one or more actions are taken based on the determined current location, orientation, direction, and time/day of the user device in comparison to the previously-recorded location data of the closest CSG cell. In some embodiments, the one or more actions include starting a search for the CSG cell, stopping a search for the CSG cell, setting a new CSG cell search interval for the CSG cell, and setting a new CSG cell measurement interval for the CSG cell. The determination on which action to take may be based on whether the current location, direction, orientation, and time/day data triggers any configured thresholds for this data with respect to the location data of the CSG cell. Furthermore, the determination of which action to take may also be based on the mode that the user device is in. For example, if the user device is in an Out of Service mode, then search intervals can be set, but measurement intervals cannot be set.

At decision block 714, it is then determined whether the CSG cell search was stopped at block 712. If so, then method 700 proceeds to block 706 where a cell selection and reselection procedure for normal cells is performed. If the CSG cell search was not stopped at decision block 714, then method 700 continues to decision block 716 where it is determined whether the CSG cell has been found. If not, then method 700 returns to block 708 to continue the CSG cell search. If the CSG cell has been found, the user device camps on the cell at block 718 and then method 700 ends.

FIG. 8 is a flow diagram of another embodiment of a method 800 for autonomous search and selection of a CSG cell by a user device. In one embodiment, method 800 provides a more detailed view of block 708 through 712 of FIG. 7. Method 800 begins at block 802 where a current location, direction, orientation, and time/day data of a user device is received based on a plurality of inputs. In one embodiment, the inputs include current serving macro cell information (i.e., cell ID, frequency, scrambling codes, BSIC), any neighboring macro cells (i.e., cell IDs, frequencies, scrambling codes, BSICs), any available WiFi networks, GPS coordinates of the user device, context sensor data of the user device, and a current time and day from a system clock of the user device. In one embodiment, if this data is not available, then it is not collected and used to determine the current location, direction, orientation, and time/day data of the user device. Some embodiments use the largest possible set of data that can be collected to make the location, orientation, and direction determination.

At block 804, previously-recorded location data of the closest CSG cell found in the user device's CSG list is received. In one embodiment, all or a portion of the current location, direction, orientation, and time/day data for the user device is used to determine which CSG is closest. For instance, the serving macro cell of the ID may match only one macro cell data from the list of CSGs on the user device, and therefore, this CSG is selected as the closest CSG. At block 706, a CSG cell proximity indicator is computed using the current location, direction, orientation, and time/day data of the user device from block 702 and the previously-recorded location data of the closest CSG cell from block 704. In one embodiment, the current location, direction, orientation, and time/day data from block 702 is combined into a single value. In other embodiments, more than one value is used for the proximity indicator, each value corresponding to each input from the location, direction, orientation, and time/day data inputs.

Subsequently, at block 808, the computer CSG cell proximity indicator is compared to a set of threshold values. In one embodiment, these threshold values are pre-configured on the user device and they set levels for when particular actions related to the CSG cell search should be taken, as detailed in block 810. At block 810, based on the threshold comparison at block 808 and a current CSG cell search status of the user device (e.g., searching, not searching, search time interval, measurement interval), one or more of actions are taken by the user device in terms of the CSG cell search. These actions include starting a search for the CSG cell, stopping the search for the CSG cell, setting a new CSG cell search interval for the CSG cell, and setting a new CSG cell measurement interval for the CSG cell.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A user device comprising:
   a memory to store data;
   a network interface device communicably coupled to the memory;
   a processing device communicably coupled to the memory and the network interface device; and
   a Closed Subscriber Group (CSG) selection subsystem executed from the memory by the processing device and communicably coupled to the network interface device, the CSG selection subsystem configured to:
   detect a CSG cell;
   determine that the CSG cell has a matching entry in a CSG list stored on the user device;
   connect to the CSG cell;
   store a record associated with the CSG cell into the memory of the user device;
   disconnect from the CSG cell;
   determine, based on the stored record, a proximity of the user device to the CSG cell; and
   adjust, subsequent to the disconnect from the CSG cell and based on the proximity, a search for the CSG cell, the adjusting comprising at least one of starting the search for the CSG cell, stopping the search for the CSG cell, setting a CSG cell search interval of the search for the CSG cell, or setting a CSG cell measurement interval of the search for the CSG cell.

2. The user device of claim 1 wherein the record comprises information including serving macro cell information, neighboring macro cell information, Global Positioning System (GPS) coordinates, available WiFi networks, time and day of CSG cell access, or context sensor data corresponding to the CSG cell access.

3. The user device of claim 1 wherein the serving macro cell information and the neighboring macro cell information comprises one or more of: a cell ID, frequency, scrambling codes, Basic Station Identity Code (BSIC), or a Radio Access Technology (RAT).

4. The user device of claim 1 further comprising at least one of:
   a cell detector component communicably coupled to the CSG selection subsystem, the cell detector component configured to provide the serving macro cell information and the neighboring macro cells information to the CSG selection subsystem;
   a GPS device communicably coupled to the CSG selection subsystem, the GPS device configured to provide the GPS coordinates to the CSG selection subsystem;
   a WiFi device communicably coupled to the CSG selection subsystem, the WiFi device configured to provide the available WiFi networks to the CSG selection subsystem;
   a system clock communicably coupled to the CSG selection subsystem, the system clock configured to provide the current time and data to the CSG selection subsystem; and
   a context-aware sensor communicably coupled to the CSG selection subsystem, the context-aware sensor configured to provide the context sensor data to the CSG selection subsystem.

5. The user device of claim 1 wherein the adjusting the CSG cell action is based on whether a threshold corresponding to one of the CSG cell actions is passed, and wherein the threshold is based on the proximity of the user device to the CSG cell.

6. A computer-implemented method comprising:
   maintaining, by a user device operating in a mobile communication system, a list of Closed Subscriber Group (CSG) cells, wherein, for each CSG cell in the list of CSG cells, the user device to:
   connect to the CSG cell;
   store, in a memory of the user device, a record associated with the CSG cell, the record comprising situational indicators of the CSG cell; and
   disconnect from the CSG cell;
   determining, by the user device subsequent to the disconnect from the CSG cell, current situational indicators of the user device;
   comparing, by the user device, the current situational indicators to previously-recorded situational indicators of the records of the CSG cells stored in the user device;
   selecting, based on the comparison, a closest CSG cell from the list of CSG cells in the user device;
   adjusting a CSG search interval based on a proximity of a first location associated with the current situational indicators of the user device to a second location associated with the previously-recorded situational indicators of the closest CSG cell; and
   searching for the closest CSG cell according to the CSG search interval.

7. The method of claim 6 wherein searching for the closest CSG cell comprises at least one of: starting a search for the closest CSG cell, stopping a search for the closest CSG cell, setting a CSG cell search interval for the closest CSG cell, and setting a CSG cell measurement interval.

8. The method of claim 6 wherein the situational indicators comprise a location of the user device, a direction of travel of the user device, an orientation, a time, or a day of the week.

9. The method of claim 6, wherein the situational indicators are determined from a set of inputs comprising serving macro cell information, neighboring macro cells information, Global Positioning System (GPS) coordinates, available WiFi networks, context sensor data, and time and day data.

10. The method of claim 9 wherein the serving macro cell information and the neighboring macro cell information comprises one or more of: a cell ID, a frequency value, scrambling codes, Basic Station Identity Code (BSIC), or Radio Access Technology (RAT).

11. The method of claim 9 wherein the proximity is determined by the serving macro cell information, the neighboring macro cell information, the GPS coordinates, the available WiFi networks, and the context-sensor data of the user device as compared to counterpart serving macro cell information, neighboring macro cell information, GPS coordinates, available WiFi networks, or context sensor data stored for the CSG cell.

12. The method of claim 6, wherein searching for the CSG cell comprises at least one of:
   setting the CSG cell search interval or cell measurement interval to a frequency faster than a current frequency when a trend of measurements of the proximity indicates the user device is moving towards the CSG cell; or
   setting the CSG search interval or cell measurement interval to a frequency slower than a current frequency when the trend of measurement of the proximity indicates the user device is moving away from the CSG cell.

13. The method of claim 9 wherein the proximity is determined by the current time and day of the user device as compared to a history of time and day of the week accesses to the CSG cell stored in the user device.

14. The method of claim 6 wherein the setting the CSG search interval further comprises at least one of:

adjusting the CSG search interval to a frequency faster than a current search frequency when the current time and day of the user device falls within at least one of a time or a day range that the user device typically camps on the CSG cell; or adjusting the CSG search interval to a frequency slower than a current search frequency when the when the current time and day of the user device falls within at least one of a time or a day range that the user device does not typically camp on the CSG cell.

15. The method of claim 6 wherein the user device is in at least one of an Idle mode, an Out of Service mode, or a Transfer to Idle mode.

16. The method of claim 6 wherein the mobile communication system implements at least one of Global System for Mobile Communications (GSM) protocol, Universal Mobile Telecommunications System (UMTS) protocol, 3GPP Long Term Evaluation (LTE) protocol, Code Division Multiple Access (CDMA) protocol, or WiMax protocol for wireless communication.

17. A non-transitory computer readable storage medium including instructions that, when executed by a processing system, cause the processing system to perform operations, comprising:

maintaining, by a user device operating in a mobile communication system, a list of Closed Subscriber Group (CSG) cells, wherein, for each CSG cell in the list of CSG cells, the user device to:
  connect to the CSG cell;
  store, in a memory of the user device, a record associated with the CSG cell, the record comprising situational indicators of the CSG cell; and
  disconnect from the CSG cell;

receiving, by the user device subsequent to the disconnect from the CSG cell, current situational indicators of the user device;

receiving, by the user device, previously-recorded situational indicators of a closest CSG cell to the user device, the closest CSG cell included in the list of CSG cells;

computing, by the user device, a proximity of the closest CSG cell to the user device based on a comparison of the received current situational indicators of the user device and the received previously-recorded situational indicators of the closest CSG cell;

comparing, by the user device, the computed proximity to a set of thresholds; and adjusting, by the user device, a search for the closest CSG cell based on the comparing, the adjusting comprising at least one of starting the search for the closest CSG cell, stopping the search for the closest CSG cell, setting a CSG cell search interval of the search for the closest CSG cell, or setting a CSG cell measurement interval of the search for the closest CSG cell.

18. The non-transitory computer readable storage medium of claim 17 wherein the situational indicators comprise a location, a direction, an orientation, a time, or a day of the week.

19. The non-transitory computer readable storage medium of claim 17, wherein the situational indicators are determined from a set of inputs comprising one or more of: serving macro cell information, neighboring macro cells information, Global Positioning System (GPS) coordinates, available WiFi networks, context sensor data, or time and day data.

20. The non-transitory computer readable medium of claim 18 wherein one or more threshold levels of the set of threshold levels are based on a proximity of a first location associated with the current situational indicators of the user device to a second location associated with the previously-recorded situational indicators of the CSG cell, the proximity determined by the serving macro cell information, the neighboring macro cell information, the GPS coordinates, the available WiFi networks, and the context-sensor data of the user device as compared to counterpart serving macro cell information, neighboring macro cell information, GPS coordinates, available WiFi networks, and context-sensor data stored for the CSG cell.

21. The non-transitory computer readable medium of claim 18 wherein one or more threshold levels of the set of threshold levels are based on the current time and day of the user device as compared to a history of time and day accesses to the CSG cell by the user device.

* * * * *